No. 654,509. Patented July 24, 1900.
F. M. BONHAM.
BLOWER FOR FEED CUTTERS.
(Application filed June 10, 1899.)
(No Model.)
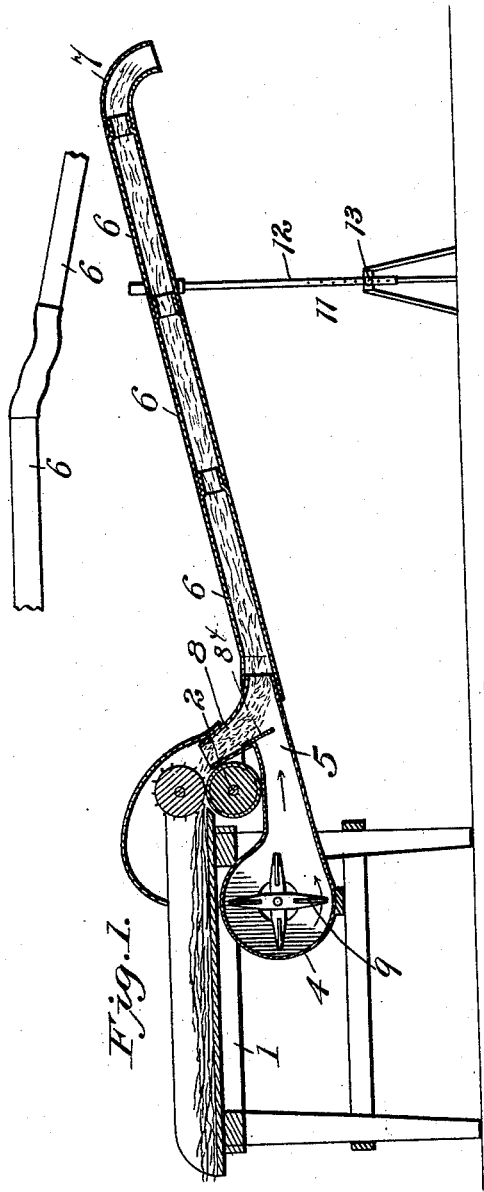
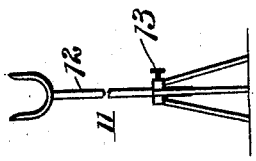
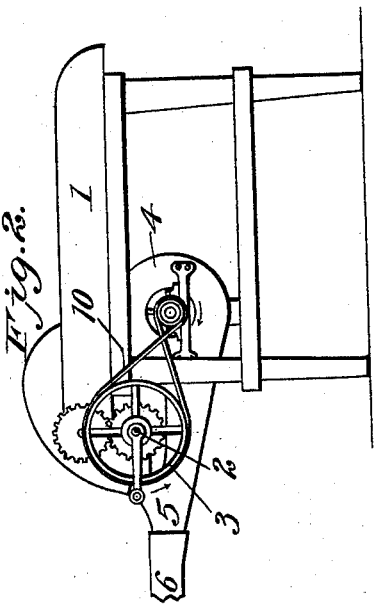
WITNESSES:
Edwin G. McKee.
G. M. Anderson
INVENTOR
F. M. Bonham
BY
E. W. Anderson
his ATTORNEY.

UNITED STATES PATENT OFFICE.

FRANCIS MARION BONHAM, OF HELTONVILLE, INDIANA.

BLOWER FOR FEED-CUTTERS.

SPECIFICATION forming part of Letters Patent No. 654,509, dated July 24, 1900.

Application filed June 10, 1899. Serial No. 720,065. (No model.)

*To all whom it may concern:*

Be it known that I, FRANCIS MARION BONHAM, a citizen of the United States, and a resident of Heltonville, in the county of Lawrence and State of Indiana, have invented certain new and useful Improvements in Feed-Cutter Attachments; and I do declare the following to be a full, clear, and exact description of the invention, such as will enable others skilled in the art to which it appertains to make and use the same, reference being had to the accompanying drawings, and to figures of reference marked thereon, which form a part of this specification.

Figure 1 of the drawings is a central longitudinal section of the invention as applied. Fig. 2 is a side view of same with conveyer-pipe broken away. Fig. 3 is a detail view of the supporting-stand. Fig. 4 is a detail view of the flexible connection for the conveyer-pipe sections.

This invention has relation to an attachment for feed-cutters whereby the cut feed may be carried and delivered to any part of the barn or other building in which the feed-cutter is located; and it consists of the novel construction and combination of parts, all as hereinafter described, and pointed out in the appended claims.

Referring to the accompanying drawings, the numeral 1 designates the frame of the ordinary feed-cutter, which may be of any known character.

2 designates the driving-shaft of the machine, which carries the hand or power wheel 3. In the machine shown two cutter-cylinders are provided, the lower of which carries the driving-shaft 2.

4 designates a cylindrical fan or blower case which is supported in the lower portion of the frame 1 underneath the feed-table. This case is provided with the rearwardly-extending discharge passage or trunk 5 at its lower portion, to which is connected a conveyer-pipe 6. This pipe is formed in any desired number of detachably-connected sections, whereby said pipe may be made of the desired length. Elbow-sections 7 may be interposed wherever necessary in order that said pipe may be carried to any desired portion of the building. The discharge passage or trunk 5 is provided with the upwardly-offset receiving branch 8, which receives the cut feed as it is discharged from the feed-cutter. This feed-receiving branch is open only at the top in order that no cut feed shall sift through the sides thereof, and its open top, as well as the feed-cutters, are inclosed to guard the cut feed from drafts and to prevent accidents. Projecting down into the blast-discharge from and in the plane of the forward wall of said feed-receiving passage is a partition $8^\times$, which acts to facilitate propelling the cut feed through the conveyer-pipe without interfering with the free downward movement of the feed from the feed-receiving passage into the conveyer-pipe.

9 designates a suitable fan or blower which is journaled in the cylindrical fan or blower case 4 and which is driven by means of the belt 10 or other suitable connection with a pulley on the shaft 3.

The lower cutter-cylinder is journaled in the recess formed by the feed-receiving passage with the blast-discharge passage and the fan-casing, whereby the upper edge of said cylinder is brought on a level with the upper edge of the forward wall of said passage in position to deliver the cut feed thereinto. This arrangement also guards the lower cutter-cylinder at front and rear and enables a shorter and lower guard attached to the rear wall of the feed-receiving passage to inclose the upper cutter-cylinder.

Any section or sections of the conveyer pipe or conduit may, if desired, be made of flexible material, or the elbow-sections only may be made of such material, in order to facilitate the placing of said pipe in any desired position. 11 designates a supporting-stand for said pipe. The supporting-arm 12 of this stand, which carries the U-shaped support for the conveyer-pipe, is made adjustable on a pivot-bolt 13 in order that it may be positioned to support the pipe at the desired heights.

The operation of the invention will be readily understood. The cut feed, as fast as it is delivered from the cutter, is by the action of the fan or blower carried into and through the conveyer-pipe and is delivered wherever desired for use.

It will be apparent that by forming the recess by the blast-discharge passage, the fan-casing, and the feed-receiving passage in which the lower cutter-cylinder is journaled I make my attachment compact, stronger, and more easily supported in the frame of the feed-cutter, and that by forming the blast-discharge passage at the lower portion of the fan-casing a shorter belt is required between the power-shaft 2 and the fan-shaft, thus economizing power and material.

Having thus described my invention, what I claim as new, and desire to secure by Letters Patent, is—

1. In a feed-cutter, the blast-fan, the fan-casing, the rearwardly-extending discharge-passage at the lower portion of said casing, the feed-receiving passage extending upwardly from said discharge-passage, and forming a recess therewith and with the fan-casing in which the lower cutter-cylinder is journaled and inclosed, the driving connection between the lower cutter-cylinder and the fan-shaft, and the inclosure for the feed-receiving passage and the cutter-cylinders extending from the forward wall of said passage, substantially as specified.

2. The herein-described attachment for feed-cutters, consisting of the blast-fan, the fan-casing, having the rearwardly-extending discharge-passage, the feed-receiving passage extending upwardly from said discharge-passage, and the partition in the plane of the rear wall of said feed-receiving passage and extending downwardly into the blast-discharge passage to facilitate propelling the cut feed through the conveyer-pipe without interfering with the free downward movement of the cut feed from said feed-receiving passage into the conveyer-pipe, substantially as specified.

In testimony whereof I affix my signature in presence of two witnesses.

FRANCIS MARION BONHAM.

Witnesses:
GEO. M. NORMAN,
OLIN B. NORMAN.